Nov. 13, 1962   J. HUFF   3,063,765
FURNITURE LEG POSITIONING AND MOUNTING ASSEMBLY
Filed Oct. 12, 1959
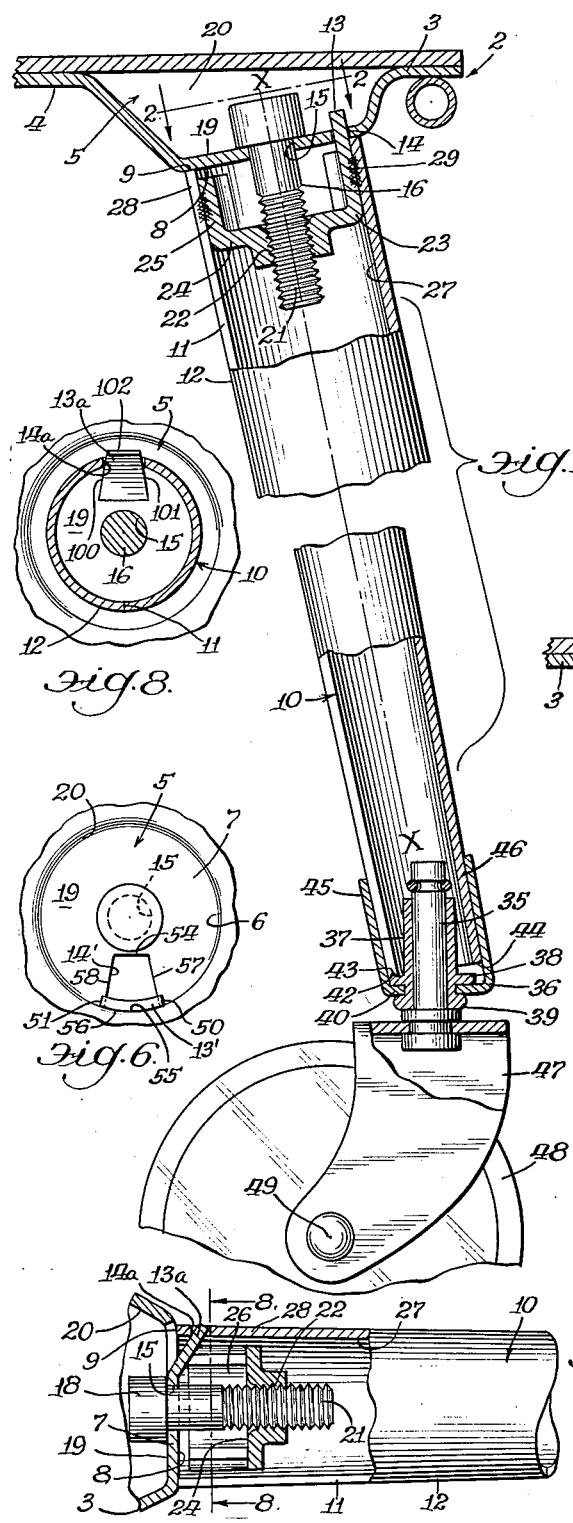
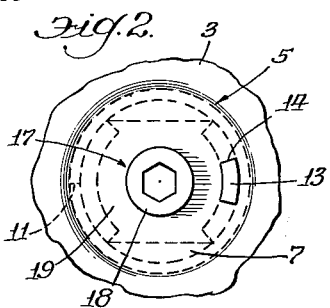
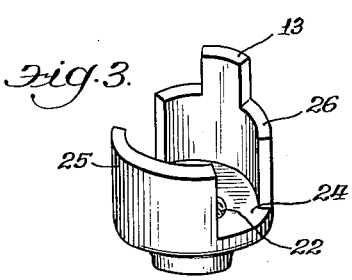
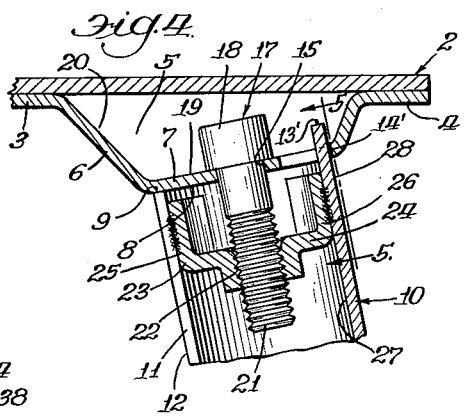
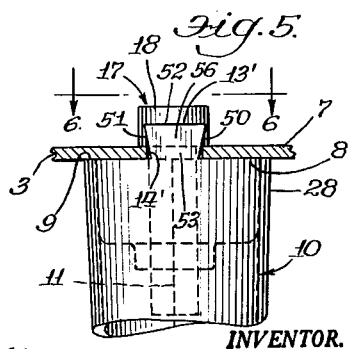
INVENTOR.
John Huff
BY John J. Kowalik
Atty.

United States Patent Office 3,063,765
Patented Nov. 13, 1962

3,063,765
FURNITURE LEG POSITIONING AND MOUNTING ASSEMBLY
John Huff, Chicago, Ill., assignor, by mesne assignments, to Louis A. Weit, Detroit, Mich.
Filed Oct. 12, 1959, Ser. No. 845,725
1 Claim. (Cl. 311—114)

This invention relates to the mounting of furniture legs to an associated top and more specifically to a novel structure for positioning a diagonally extending leg with respect to a supporting caster wheel and to the top to provide good castering action.

In the manufacture of inexpensive furniture legs, these are rolled into tubular form from sheet metal stock which presents an aesthetically unattractive longitudinal seam. The seam is intended to be concealed on the inner side of the leg when assembled with the top. The leg according to my invention is preferably, though not necessarily, conical and essentially straight and the caster assembly has a mounting upon the lower end of the leg which positions the pivot spindle of the caster wheel vertically in one position of the inclined leg, the leg and mounting bracket therefore having means for positioning the leg with respect to the caster. The structure or contour of the leg is not particularly material provided that it is straight.

The invention contemplates a novel positioning arrangement which controls the disposition of the leg with respect to the top and locates the caster wheel assembly so that the spindle thereof is positioned vertically.

A more specific object of the invention is to provide a novel guide and locating means on the caster assembly, the leg and the leg mounting bracket such as will firmly hold the parts in predetermined relation positioning the caster spindle vertically.

Another object of the invention, particularly in several embodiments thereof, is to provide a novel guiding and tightening as well as holding means for positioning and securing the leg to its mounting bracket.

A further object is to provide a novel positioning means for the leg from the supporting bracket which in addition to locating the leg also serves as a temporary mounting means to facilitate assembly of the leg with the bracket.

These and other objects and advantages inherent in and encompassed by the invention will become more readily apparent to those skilled in the art from the following specification and drawings wherein:

FIGURE 1 is a broken apart longitudinal sectional view of the leg assembly with parts shown in elevation.

FIGURE 2 is a fragmentary plan view taken essentially on line 2—2 of FIGURE 1;

FIGURE 3 is a perspective view of the nut structure;

FIGURES 4, 5 and 6 illustrate a modified form of the invention.

FIGURE 4 being a fragmentary longitudinal section;

FIGURE 5 a sectional view on line 5—5 of FIGURE 4; and

FIGURE 6 a sectional view on line 6—6 of FIGURE 5;

FIGURES 7 and 8 illustrate a further embodiment;

FIGURE 7 being a longitudinal section, and,

FIGURE 8 a plan view taken essentially on line 8—8 of FIGURE 7.

*Description of the Embodiment of FIGURES 1-3*

Describing the invention in detail with particular reference to FIGURES 1-3, there is shown a top structure 2 to which is secured a bracket 3 by its peripheral flange 4 as by welding, the bracket having a dished center part 5 comprising a dependent wall 6 which merges into a bottom wall 7 which is inclined from the horizontal and slopes diagonally downwardly inwardly of the table and provides a bottom abutment or seating surface 8 which engages the upper edge 9 of a tubular leg 10.

The leg 10 which is preferably conical and formed of sheet metal with a longitudinal seam 11 on its inner side 12.

The leg 10 is held and located in this position with seam 11 inwardly by a positioning lug 13 which in the present embodiment is slightly arcuate and fits complementally into an opening 14 provided in the base wall 7 of the bracket radially outwardly of the center aperture 15 through which extends the shank 16 of a bolt 17, the head 18 of which seats on the top side 19 of the base wall 7 and is pocketed within the cavity 20 formed in the part 5. The lower end 21 of the shank 16 of bolt 17 is threaded and enters into a threaded opening 22 of a nut structure 23.

The nut structure 23 is essentially U-shaped in side elevation and comprises a bottom wall 24 centrally within which is formed the threaded aperture 22, the wall 24 merging at opposite ends into the lower extremities of upwardly extending arcuate sections or portions 25 and 26 which fit complementally within the inner periphery 27 of the upper end 28 of the leg and are weld connected thereto as at 29 and 30. Of course, the shape of the nut is not critical.

The beforementioned positioning lug 13 is formed in the present embodiment as an upward extension on portion 26 of the nut structure and projects above the upper edge 9 of the leg 10 into the pocket 20.

The lug 13 which fits snugly into the complemental slot 14 serves not only to position the leg circumferentially but is long enough and in part because of its curvature and thickness strong enough to support the leg 10 so that in assembly the top 2 may be positioned vertically and the leg held temporarily horizontally cantilever fashion by the lug 13 in position to permit ready entry of the bolt 17 and its threading into the nut aperture 22.

It will be apparent that the leg 10 is essentially straight as contrasted with the current practice of bending the lower end.

The vertical positioning of the caster wheel spindle 35 is accomplished by disposing it in the ferrule 36 at a complementary angle to the angle of inclination of the leg, the spindle being disposed within a holder 37 which at its lower end has a pair of flanges 38 and 39 embracing the bottom wall 40 of the ferrule 36 and staked thereto, the upper flange 38 being provided with a projection 42 which extends into a notch 43 in the lower edge 44 of the leg, the notch 43 and projection being located at a point disposing the spindle and holder vertically at the chosen inclination of the leg. The ferrule 36 has an annular sleeve portion 45 about wall 40 telescoped and wedged over the lower end 46 of leg 10. The spindle 35 is provided with a fork 47 at its lower end which mounts a wheel 48 on the horizontal pin 49.

*Embodiment of FIGURES 4-6*

The present embodiment is in general similar to that shown in FIGURES 1-3 and like parts are identified by corresponding reference numerals. In the present instance the lug 13' is formed as an integral extension of the upper end 28 of leg 10 and is of arcuate conformation curving about the longitudinal axis X—X of the leg. The lug 13' has circumferential edges 50, 51 which taper downwardly whereby the lug 13' is wider at its upper end 52 than its lower end 53. The width of the upper end of the lug 13' is less than the radial distance between the inner and outer circumferential edges 54, 55 of slot 14' in base wall 7 so that the lug 13' may be inserted into the slot 14' by entering it widthwise transversely of the edges 54, 55 and then rotated and moved so that the outer side 56 of lug 13' seats at the lower end 53 of lug 13' against the edge 55 of slot 14' which has its lateral or circumferential edges 57, 58 converging inwardly or toward edge 54. This construction insures a positive interlock of the lug 13' to wall 7 within slot 14' so that the leg may be hung horizontally from the bracket while the bolt 17 is threaded into the nut.

Embodiment of FIGURES 7 and 8

Referring now to the structure of FIGURES 7 and 8, the general arrangement is the same as previously described and like parts are identified by corresponding reference numerals. In this modification the lug 13a is provided on the bracket and the aperture 14a on the leg 10. The lug 13a is punched out from wall 7 and tapers outwardly with its lateral sides 100 and 101 converging into a vertex 102. The lug 13a extends diagonally downwardly and enters the radial aperture 14a in the upper end 28 of leg 10. As seen in FIGURE 7 the leg 10 is suspended cantilever fashion from the lug 13a while the edge 9 bears against surface 8 of wall 7 aligning the aperture 22 with opening 15 through which the sank 16 of bolt 17 is entered and threaded into the nut opening 22.

In each instance upon threading of bolt 17 the leg is drawn up against the bottom wall 7 and is properly positioned in relation to the caster wheel assembly.

It will be understood that several embodiments of the invention have been described, and that other modifications will become readily apparent within the scope of the appended claim:

What is claimed is:

A leg assembly including a leg and nut portion having a lug extending axially of the leg eccentric from the center portion and being rigidly connected with the leg assembly for constrained rotational movement therewith and the nut portion having a centered nut portion opening, and a bracket having an opening aligned with the nut opening and the bracket having a slot aligned and receiving the lug, said slot having margins tapering toward said nut opening, said lug having edge surfaces tapered downwardly toward the leg center, and a bolt having shank extending through the opening in the bracket and threaded to the nut opening and having a head engaging a side of the bracket opposite the leg, said lug surfaces wedging against the margins of the slot upon the bolt being loose and the leg being canted.

References Cited in the file of this patent

UNITED STATES PATENTS

| | | |
|---|---|---|
| 705,653 | Davis | July 29, 1902 |
| 1,675,827 | Shrader | July 3, 1928 |
| 2,573,304 | Bronstein | Oct. 30, 1951 |
| 2,738,246 | Hogan | Mar. 13, 1956 |
| 2,809,876 | Huff | Oct. 15, 1957 |
| 2,848,732 | Huff | Aug. 26, 1958 |
| 2,884,995 | Healy | May 5, 1959 |
| 2,905,422 | Sacharow | Sept. 22, 1959 |